(12) United States Patent
Kobuse

(10) Patent No.: US 10,187,581 B2
(45) Date of Patent: Jan. 22, 2019

(54) IMAGE PICKUP APPARATUS THAT COMPENSATES FOR FLASH BAND, CONTROL METHOD THEREFOR, STORAGE MEDIUM, AND VIDEO PROCESSING APPARATUS

(71) Applicant: CANON KABUSHIKI KAISHA, Tokyo (JP)

(72) Inventor: Takenori Kobuse, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/615,993

(22) Filed: Jun. 7, 2017

(65) Prior Publication Data

US 2017/0366721 A1    Dec. 21, 2017

(30) Foreign Application Priority Data

Jun. 15, 2016    (JP) .................................. 2016-118924

(51) Int. Cl.
| | | |
|---|---|---|
| *H04N 5/235* | (2006.01) | |
| *H04N 5/353* | (2011.01) | |
| *H04N 5/357* | (2011.01) | |
| *G03B 31/00* | (2006.01) | |
| *G06T 1/00* | (2006.01) | |

(52) U.S. Cl.
CPC ............ *H04N 5/235* (2013.01); *G03B 31/00* (2013.01); *H04N 5/3532* (2013.01); *G06T 1/0007* (2013.01); *H04N 5/3572* (2013.01)

(58) Field of Classification Search
CPC .... H04N 5/235; H04N 5/3532; H04N 5/3572; G03B 31/00; G06T 1/0007
See application file for complete search history.

(56) References Cited

U.S. PATENT DOCUMENTS

| | | | | |
|---|---|---|---|---|
| 2011/0001859 A1* | 1/2011 | Matsuura | ............. | H04N 5/2354 348/296 |
| 2012/0188403 A1* | 7/2012 | Gomita | ................ | H04N 5/2351 348/226.1 |
| 2013/0208144 A1* | 8/2013 | Shirakawa | ........... | H04N 5/3532 348/234 |
| 2013/0208149 A1* | 8/2013 | Kamiya | ............... | H04N 5/2354 348/241 |

(Continued)

FOREIGN PATENT DOCUMENTS

JP    2014-197822 A    10/2014

*Primary Examiner* — Jason A Flohre
(74) *Attorney, Agent, or Firm* — Cowan, Liebowitz & Latman, P.C.

(57) ABSTRACT

An image pickup apparatus which satisfactorily compensates for a flash band appearing due to an external flash and prevents a row insensitive to the flash from appearing in a corrected image. The flash band appearing in a plurality of frames consecutive in terms of time is detected based on an image signal output from an image pickup device which sequentially starts exposure and sequentially reads out signals for each row of pixels. An image in at least one of those frames is corrected to a full-screen flash image. When a width of the flash band is smaller than the number of rows in one frame, a row in which the flash band does not appear is interpolated using a row in which the flash band appears and which immediately precedes or immediately succeeds the row in which the flash band does not appear.

12 Claims, 7 Drawing Sheets

(56) References Cited

U.S. PATENT DOCUMENTS

| | | | |
|---|---|---|---|
| 2014/0152867 A1* | 6/2014 | Shirakawa | H04N 5/235 348/226.1 |
| 2014/0232908 A1* | 8/2014 | Kishida | H04N 5/357 348/241 |
| 2015/0229818 A1* | 8/2015 | Fukuyama | H04N 5/3532 348/367 |

* cited by examiner

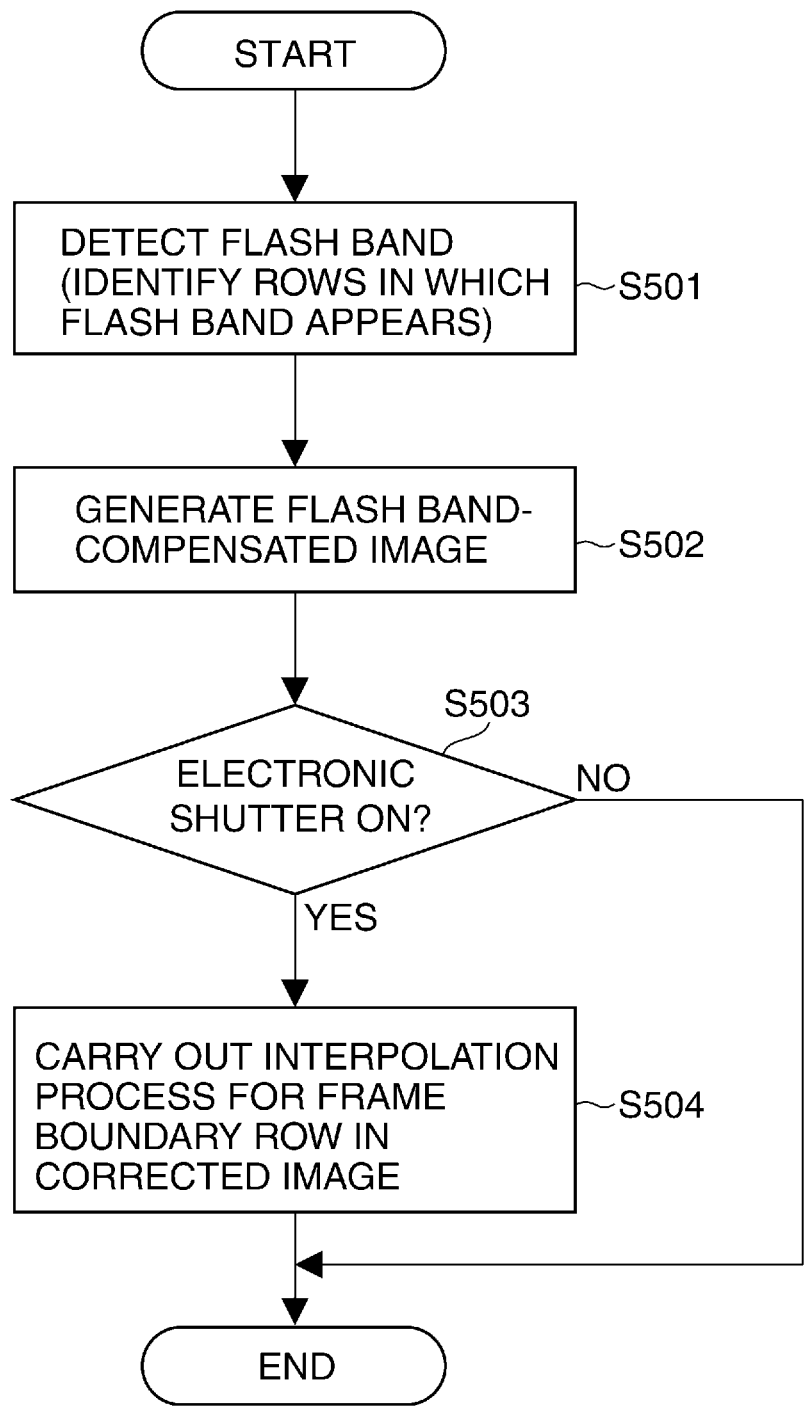

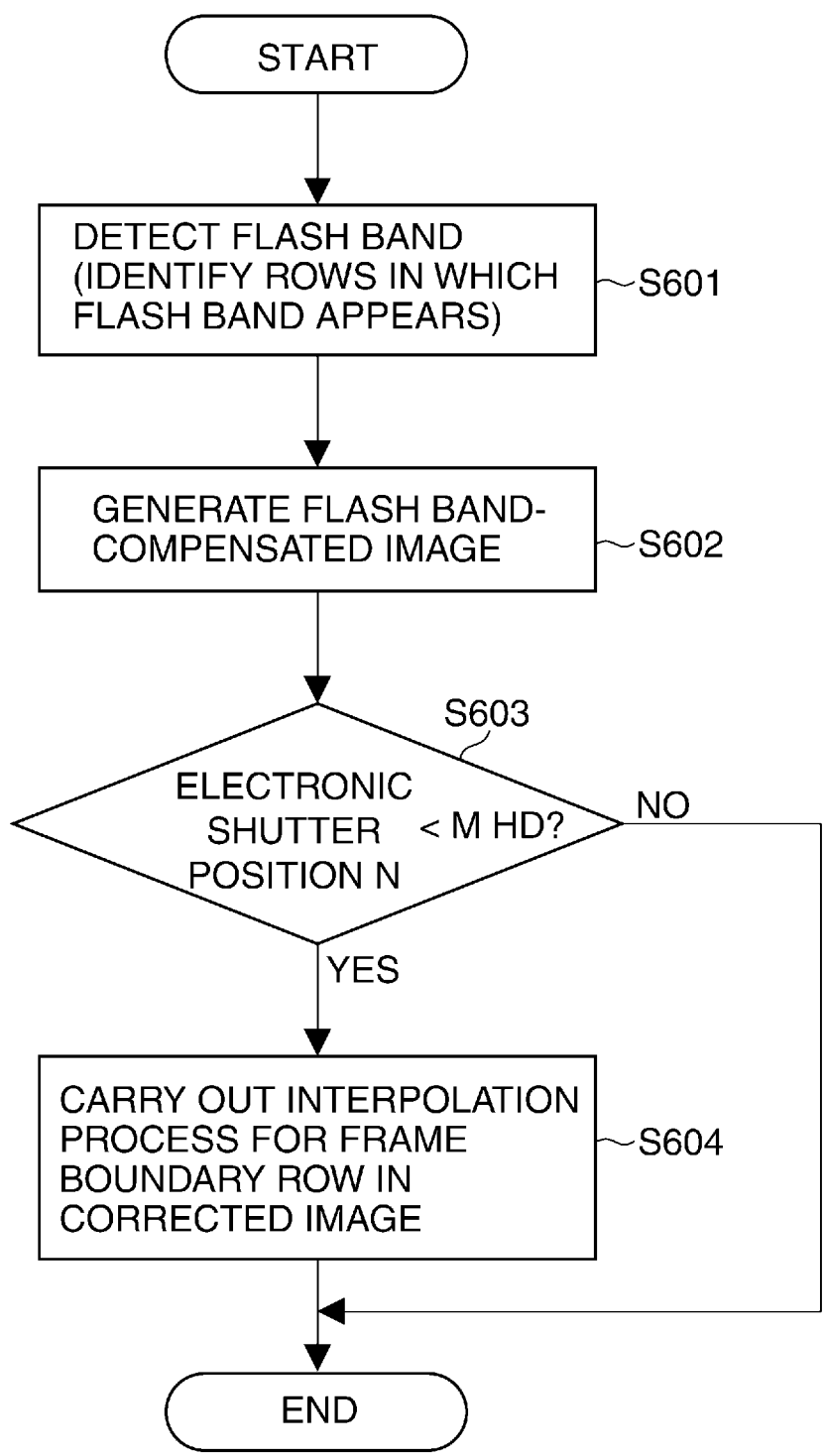

IMAGE PICKUP APPARATUS THAT COMPENSATES FOR FLASH BAND, CONTROL METHOD THEREFOR, STORAGE MEDIUM, AND VIDEO PROCESSING APPARATUS

BACKGROUND OF THE INVENTION

Field of the Invention

The present invention relates to an image pickup apparatus such as a digital single-reflex camera, a digital still camera, or a digital video camera, a control method therefor, a storage medium, and a video processing apparatus, and in particular, to improvements in flash band compensation technique of the image pickup apparatus.

Description of the Related Art

Some image pickup apparatuses such as a digital camera have a rolling shutter image pickup device which sequentially starts exposure and sequentially reads out signals in each row of pixels. Such image pickup apparatuses have a problem that a flash band that creates different levels of luminance appears in an image in one frame due to an external flash because exposure timing and readout timing vary with rows. Conventionally, there has been proposed a flash band compensation technique for use in a case where a width of a flash band, which appears while an electronic shutter of an image pickup device is in use, is smaller than the number of rows in one frame (Japanese Laid-Open Patent Publication (Kokai) No. 2014-197822).

According to Japanese Laid-Open Patent Publication (Kokai) No. 2014-197822 above, however, a flash band is detected based on an output signal from the image pickup device, and based on a result of the detection, the way of driving the image pickup device is changed to compensate for the flash band, it is necessary to configure a feedback circuit shorter than one frame, and this is hard to implement.

SUMMARY OF THE INVENTION

The present invention provides an image pickup apparatus with a flash band compensation technique which, even when a width of a flash band appearing due to an external flash is smaller than the number of rows in one frame, satisfactorily compensates for the flash band to prevent a row insensitive to the flash from appearing in a corrected image, a control method therefor, a storage medium, and a video processing apparatus.

Accordingly, the present invention provides an image pickup apparatus comprising an image pickup device configured to sequentially start exposure and sequentially read out signals for each row of pixels, a detection unit configured to, based on an image signal output from the image pickup device, detect a flash band that appears in a plurality of frames consecutive in terms of time due to an external flash, a correction unit configured to correct an image in at least one of the plurality of frames in which the flash band was detected by the detection unit to a full-screen flash image, and a determination unit configured to determine whether a width of the flash band detected by the detection unit is equal to or greater than the number of rows in one frame, wherein when the determination unit determines that the width of the flash band is not equal to or greater than the number of rows in one frame, the correction unit interpolates a row in which the flash band does not appear using a row in which the flash band appears and which immediately precedes or immediately succeeds the row in which the flash band does not appear.

According to the present invention, even when a width of a flash band appearing due to an external flash is smaller than the number of rows in one frame, the flash band is satisfactorily compensated for to prevent a row insensitive to the flash from appearing in a compensated image.

Further features of the present invention will become apparent from the following description of exemplary embodiments (with reference to the attached drawings).

BRIEF DESCRIPTION OF THE DRAWINGS

FIG. 2 is a view useful in explaining an output image in a case where an external flash is fired from a strobe or the like.

FIG. 5 is a flowchart useful in explaining an interpolation process for a frame boundary row in which no flash band appears.

FIG. 6 is a flowchart useful in explaining an interpolation process for a frame boundary row in which no flash band appears in a digital video camera that is a second embodiment of an image pickup apparatus according to the present invention.

DESCRIPTION OF THE EMBODIMENTS

Hereafter, embodiments of the present invention will be described with reference to the drawings.

Figure 1:
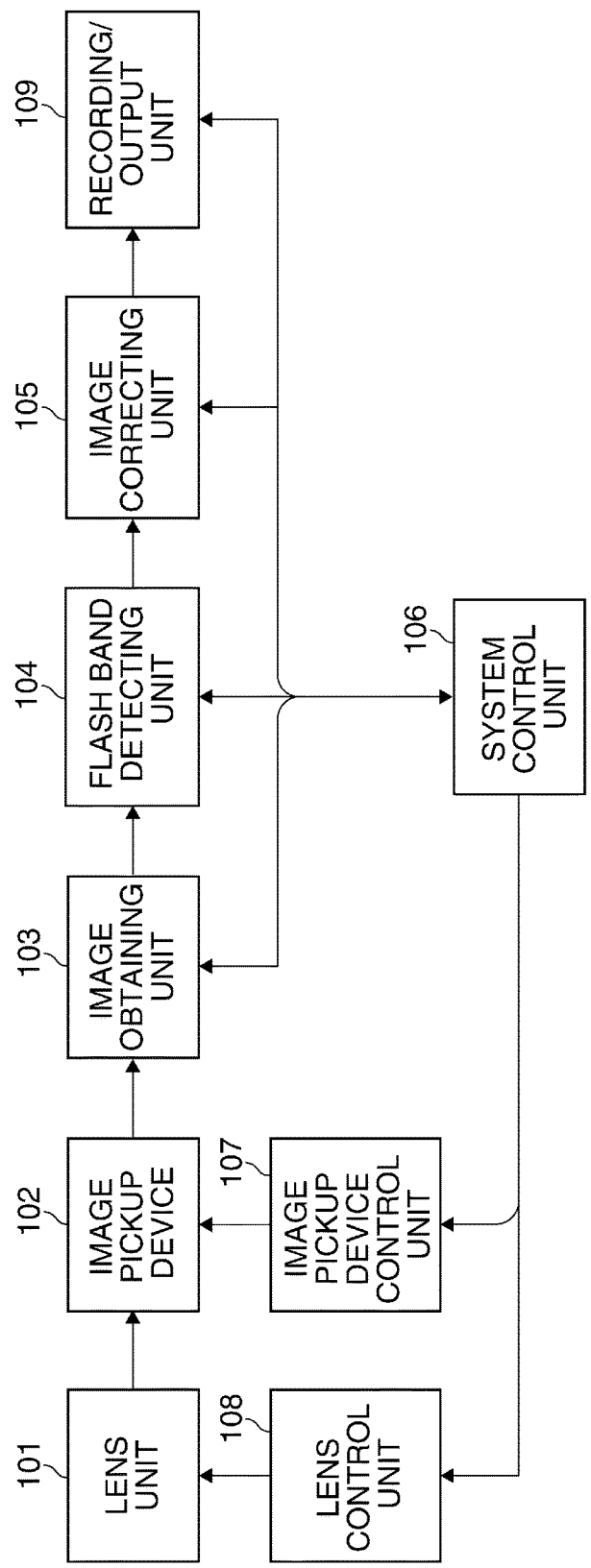
FIG. 1 is a block diagram schematically showing a control system of a digital video camera that is a first embodiment of an image pickup apparatus according to the present invention.

FIG. 1 is a block diagram schematically showing a control system of a digital video camera that is a first embodiment of an image pickup apparatus according to the present invention.

Referring to FIG. 1, a lens unit 101 has a focusing mechanism, a diaphragm mechanism, an ND filter, a zoom mechanism, and so forth. An image pickup device 102 is comprised of a CMOS sensor or the like, which sequentially starts exposure and sequentially reads out signals for each row of pixels, and photoelectrically converts a bundle of rays from a subject formed through the lens unit 101 into an electric signal and outputs a video signal. An image obtaining unit 103 obtains image information generated using the video signal output from the image pickup device 102. It should be noted that the image obtaining unit 103 includes an analog-digital front-end if an output from the image pickup device 102 is an analog signal.

A flash band detecting unit 104 detects whether or not a flash band, which appears in a plurality of frames consecutive in terms of time due to an external flash fired from a strobe or the like, appears as a video signal. When the flash band is detected by the flash band detecting unit 104, the image correcting unit 105 corrects an image in which the flash band was detected, to a full-screen flash image.

A system control unit 106, which includes a CPU, a RAM, a ROM, and so forth, is responsible for controlling the entire camera, and for example, sends and receives information to and from each block of the camera, determines operation of the camera through user operation, and controls operation of each block. An image pickup device control unit 107 drivingly controls the image pickup device 102. For example, the image pickup device control unit 107 provides control to determine gain for the image pickup device 102 and output vertical drive pulses VD to the image pickup device 102 as well as to control shutter speed. Here, the shutter speed which means an exposure time of an electronic shutter of the image pickup device 102 is controlled by the image pickup device control unit 107 sending electric charge accumulation start timing and electric charge readout timing to the image pickup device 102.

A lens control unit 108 controls the diaphragm mechanism, the focusing mechanism, the zoom mechanism, the ND filter, and so forth of the lens unit 101. A recording/output unit 109 records a video signal, which has been subjected to predetermined image correction, in a storage medium or outputs the video signal to a display device such as a display.

Referring to FIGS. 2 to 4B, a description will be given of an exemplary frame correction method for use when a flash band appears.

Figure 2:
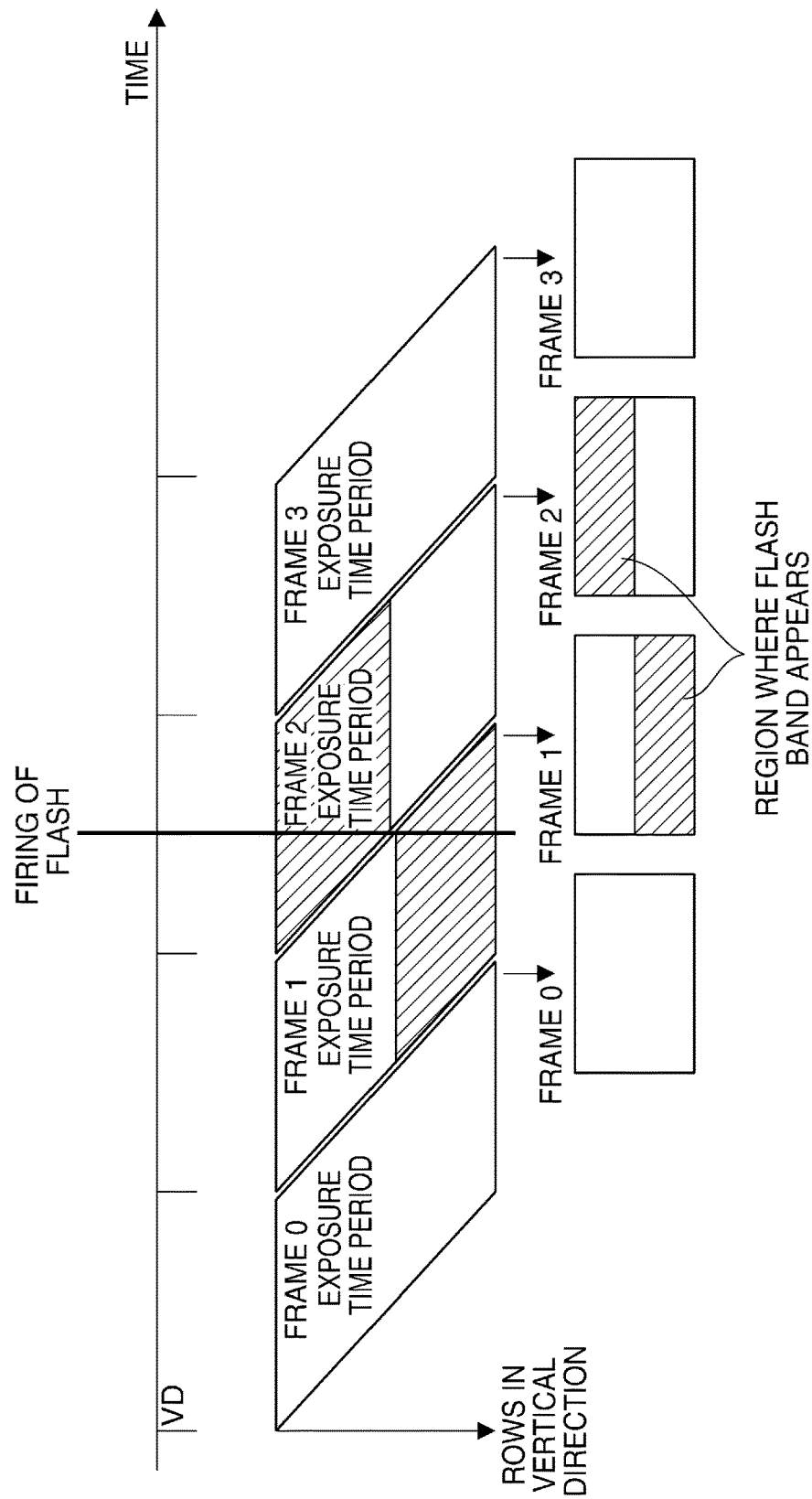

FIG. 2 is a view useful in explaining an output image in a case where an external flash is fired from a strobe or the like. In FIG. 2, the horizontal axis represents time, and the vertical axis represents the number of rows in a vertical direction, and there is shown a relationship between a time at which an external flash is fired and images that are output at this time. In FIG. 2, VD represents a vertical driving pulse which is input to the image pickup device 102.

When a flash shorter than a time period corresponding to one row is fired at the time shown in FIG. 2, a frame 1 is being exposed to light in a lower part of a screen, and a succeeding frame 2 is being exposed to light in an upper part of the screen. Thus, a flash band appears from a midpoint toward a bottom of the frame 1, and in the frame 2, a flash band appears in rows up to the same row as a row in which the flash band appears in the frame 1.

Figure 3:
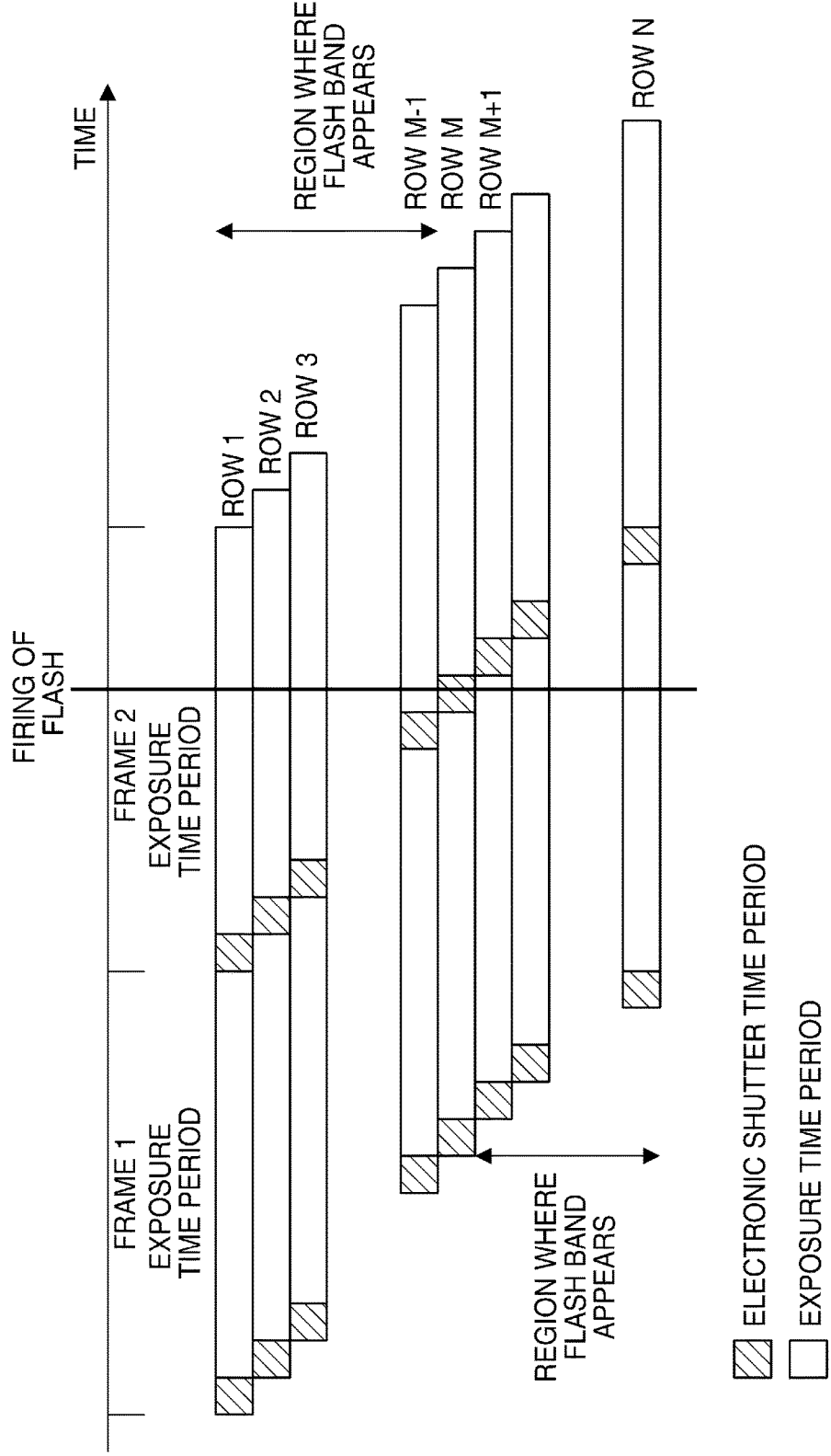
FIG. 3 is a diagram showing enlarged exposure time periods in a frame 1 and a frame 2 in FIG. 2.
Figure 4A:
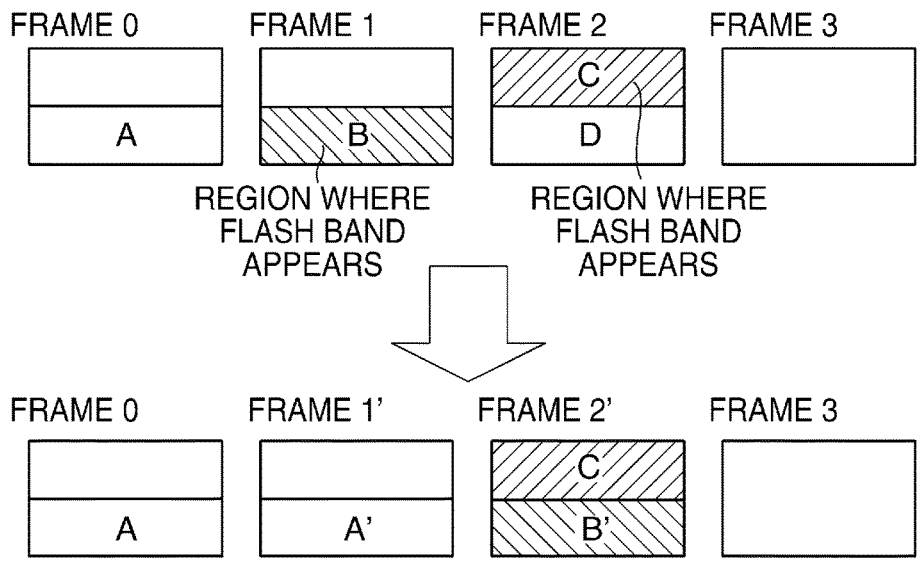
FIGS. 4A and 4B are diagrams useful in explaining an example in which an image in which a flash band was detected is corrected to a full-screen flash image by an image correction unit.
Figure 4B:
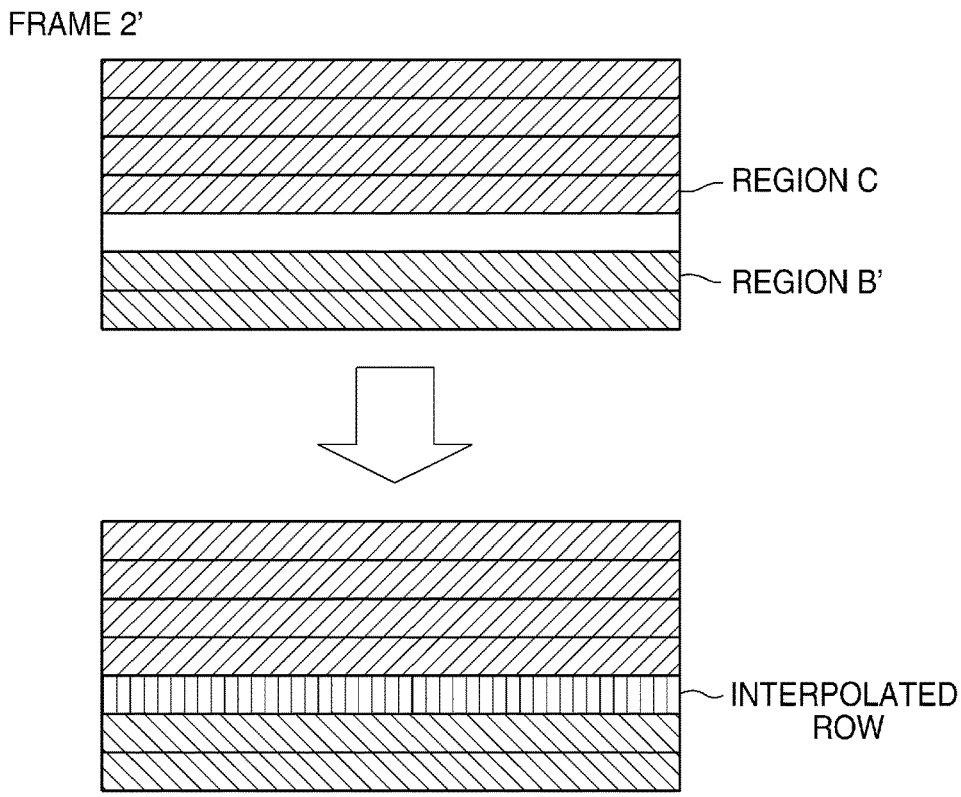

Referring to FIGS. 3, 4A, and 4B, a description will be given of problems which arise when an electronic shutter that resets photodiodes of the image pickup device 102 while one frame is being exposed to light is used. FIG. 3 is a diagram showing enlarged exposure time periods in the frame 1 and the frame 2 in FIG. 2.

It is assumed that the electronic shutter is turned on at input of a first HD (HD: horizontal driving signal), which is input at the beginning of an exposure time period, so as to maximize the exposure time period while the electronic shutter is kept on.

When a flash is fired from a strobe or the like for a very short time period at the time shown in FIG. 3, the flash starts entering a row M+1 in the frame 1, causing a flash band to appear. The flash enters the frame 2 up to a row M−1. The flash is supposed to enter a row M in the frame 2, but due to the electronic shutter being on during this time period, no flash enters the row M, and hence a flash band appears in rows up to the row M−1. For this reason, a flash band corresponding to the total number of rows N in one frame appears unless the electronic shutter is on, but since the electronic shutter is on, the number of rows in which a flash band appears is smaller than the total number of rows N in one frame.

Referring next to FIGS. 4A and 4B, a description will be given of an example where an image in which a flash band was detected is corrected to a full-screen flash image by the image correcting unit 105. FIG. 4A is a diagram schematically showing frames 1 and 2 in which a flash band appears as shown in FIG. 2 and frames 0 and 3 immediately preceding and succeeding the frames 1 and 2, respectively. As shown in FIG. 4A, to bring together the frame 1 and the frame 2 in which a flash band appears into one frame, a region A' is obtained by substituting a region A in the frame 0 for a region B in the frame 1. A region B' is obtained by substituting the region B in the frame 1 for a region D in the frame 2.

Through this substitution, the frame 1 is corrected to a frame 1' in which no flash band appears, and the frame 2 is corrected to a frame 2' in which a flash band appears all over the screen to generate an image flashing all over the screen (full-screen flash image) in only one frame.

However, as described above, when the electronic shutter is on, the number of rows in which the flash band appears is smaller than the total number of rows in one frame. For this reason, when the frame 2' is to be generated, a row (boundary row) in which no flash band appears is present between the region C and the region B' as shown in FIG. 4B, and hence a horizontal line appears in the full-screen flash image, which in turn causes discomfort.

Therefore, in the present embodiment, the boundary row in which no flash band appears in the full-screen flash image of the frame 2', which is the corrected image, is interpolated by, for example, using a last row (immediately preceding the boundary row) in the region C or a first row (immediately succeeding the boundary row) in the region B'. This prevents a horizontal line, which is a row insensitive to the flash, from appearing in the full-screen flash image.

Referring next to FIG. 5, a description will be given of an interpolation process for a frame boundary row in which no flash band appears. Processes in FIG. 5 are carried out by the CPU or the like executing programs stored in the ROM or the like of the system control unit 106 and expanded into the RAM.

Referring to FIG. 5, in step S501, the system control unit 106 causes the flash band detecting unit 104 to judge whether or not a flash band appears in a video signal. When the flash band appears, the system control unit 106 identifies a row in which the flash band appears, and the process proceeds to step S502. In the step S502, the system control unit 106 causes the image correction unit 105 to perform the flash band compensation described above with reference to FIG. 4A to generate a full-screen flash image, and the process proceeds to step S503.

In the step S503, the system control unit 106 judges whether or not the electronic shutter of the image pickup device 102 was turned on for a frame in which the flash band was detected. When the electronic shutter was not turned on, the system control unit 106 determines that the flash band was successfully compensated for to obtain the full-screen flash image in the step S502, and ends the process. When the system control unit 106 judges that the electronic shutter was turned on, the process proceeds to step S504. It should be noted that in the step S503, whether or not the electronic shutter was on should not necessarily be judged, but whether or not a flash band corresponding to the total number of rows in one frame appears may be judged when rows in which the flash band appears are identified in the step S501.

In the step S504, since a row in which no flash band appears should be present at a frame boundary in the full-screen flesh image obtained in the step S502, the system control unit 106 causes the image correction unit 105 to carry out an interpolation process for this boundary row and ends the process. It should be noted here that the interpolation process adopted here is carried out using a simple method that involves copying the last row in the region C or the first row in the region B' to the row in which no flash band appears as described earlier with reference to FIG. 4B, but the way to carry out the interpolation process is not limited to this. For example, interpolation may be performed by averaging the last row in the region C and the first row in the region B' in FIG. 4B or by obtaining a weighted average using more rows than those two rows.

As described above, in the present embodiment, even when a width of a flash band resulting from an external flash is smaller than the total number of rows in one frame due to, for example, turning-on of the electronic shutter, the flash band is satisfactorily compensated for to prevent a row insensitive to the flash from appearing in a corrected image.

Referring next to FIG. 6, a description will be given of a digital video camera that is a second embodiment of the image pickup apparatus according to the present invention. It should be noted that for elements corresponding to those of the first embodiment described above, the same figures and reference symbols are used in the following description of the present embodiment.

In the first embodiment described above, whether or not to interpolate a frame boundary row in which no flash band appears is judged according to whether or not the system control unit 106 judges whether or not the electronic shutter of the image was turned on, but a full-screen flash image may cause increased discomfort, depending on a position of the electronic shutter. For this reason, in the present embodiment, control is provided so as not to interpolate a frame boundary row in which no flash band appears.

FIG. 6 is a flowchart useful in explaining an interpolation process for a frame boundary row in which no flash band appears. Processes in FIG. 6 are carried out by the CPU or the like executing programs stored in the ROM or the like of the system control unit 106 and expanded into the RAM. It should be noted that processes in steps S601, S602, and S604 in FIG. 6 are the same as the steps S501, S502, and S504, respectively, in the first embodiment described above (FIG. 5), and therefore, description thereof is omitted.

Referring to FIG. 6, in the step S603, the system control unit 106 determines a time n at which the electronic shutter of the image pickup device 102 was turned on for a frame in which the flash band was detected in the step S601. Here, when the electronic shutter was not turned on, n=0 holds, and when exposure is performed for a maximum time period while the electronic shutter is kept on, n=1 holds. The greater the numeric value of n is, the shorter the exposure time period (shutter speed) is.

When the system control unit 106 judges that the numeric value of the time n at which the electronic shutter was turned on is smaller than an arbitrary numeric value m determined in advance, the process proceeds to the step S604, in which the system control unit 106 in turn carries out an interpolation process for the frame boundary row in the full-screen flash image obtained in the step S602 and ends the process. When the numeric value of the time n at which the electronic shutter was turned on is equal to or greater than the numeric value m, that is, when the exposure time period is shorter than the numeric value m, the system control unit 106 ends the process without carrying out the interpolation process since the full-screen flash image would cause increased discomfort due to the interpolation process for the frame boundary row in the full-screen flash image. It should be noted that the numeric value m is a value determined in advance as a value at which it is possible to output an image with no discomfort irrespective of whether the electronic shutter is on or off.

As described above, in the present embodiment, when the electronic shutter is on, the interpolation process for the frame boundary row in the full-screen flash image is not carried out, depending on the time n at which the electronic shutter was turned on, and as a result, an image with no discomfort is output. The other constructions and operational advantages are the same as those in the first embodiment described above.

Figure 7:
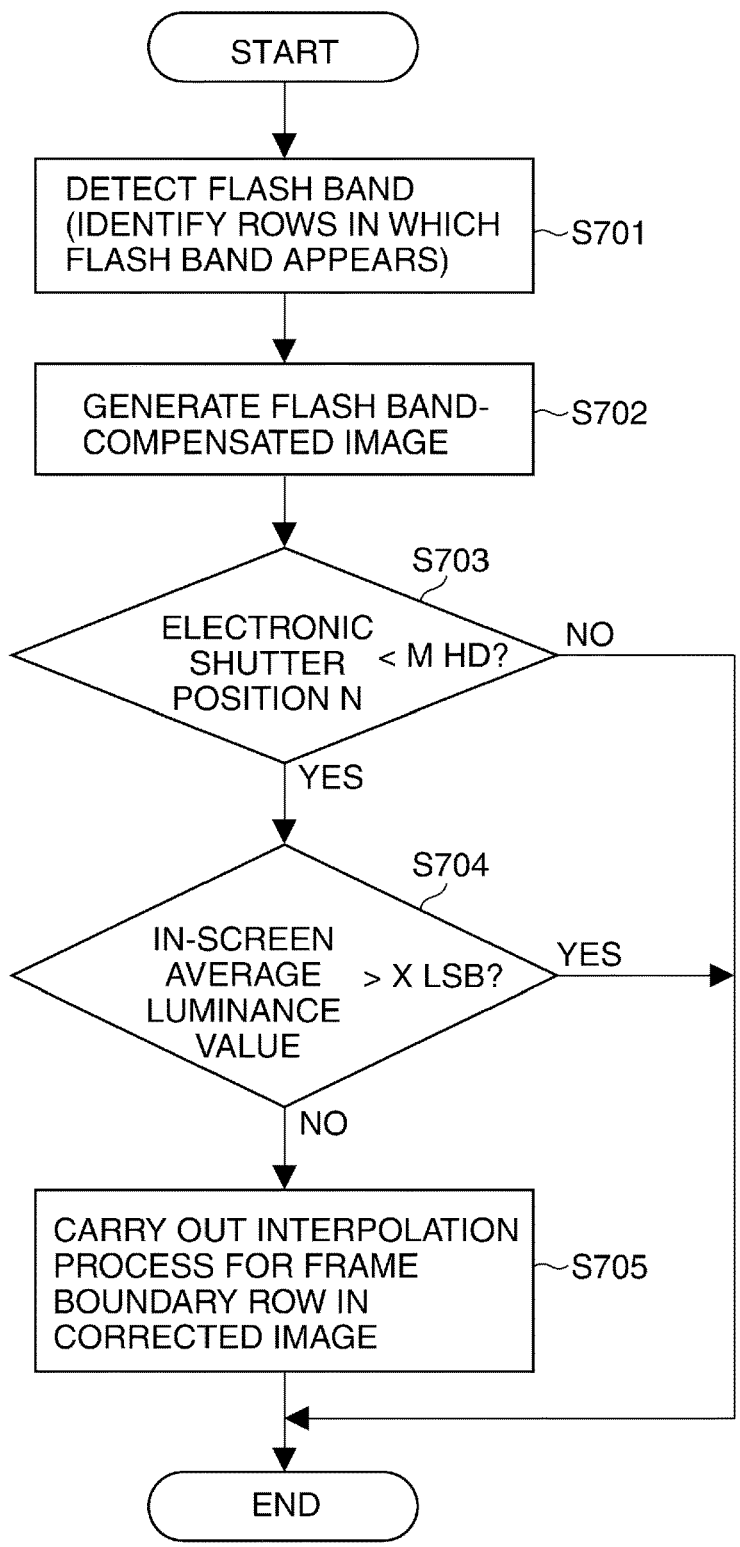
FIG. 7 is a flowchart useful in explaining an interpolation process for a frame boundary row in which no flash band appears in a digital video camera that is a third embodiment of an image pickup apparatus according to the present invention.

Referring next to FIG. 7, a description will be given of a digital video camera that is a third embodiment of the image pickup apparatus according to the present invention. It should be noted that for elements corresponding to those of the first and second embodiments described above, the same figures and reference symbols are used in the following description of the present embodiment.

Referring to FIG. 4B, when an average luminance value of the corrected image or an average luminance value of the frame boundary row is large, the corrected image causes no discomfort since there is only a small difference between the region C and the region B'. For this reason, in the present embodiment, when an average luminance value of the corrected image or an average luminance value of the frame boundary row is greater than a value determined in advance, control is provided so as not to carry out an interpolation process for the frame boundary row in which no flash band appears.

FIG. 7 is a flowchart useful in explaining an interpolation process for a frame boundary row in which no flash band appears. Processes in FIG. 7 are carried out by the CPU or the like executing programs stored in the ROM or the like of the system control unit 106 and expanded into the RAM. It should be noted that processes in steps S701 to S703 and S705 in FIG. 7 are the same as the steps S601 to S603 and S604, respectively, in the second embodiment described above (FIG. 6), and therefore, description thereof is omitted.

Referring to FIG. 7, when the system control unit 106 judges in the step S703 that the numeric value of the time n at which the electronic shutter was turned on is smaller than the arbitrary numeric value m determined in advance, the process proceeds to the step S704. In the step S704, the system control unit 106 calculates an average luminance value of the corrected image generated in the step S702 (or an average luminance value of the frame boundary row) and determines whether or not the calculated average luminance value is greater than an arbitrary value X [LSB] determined in advance.

When the average luminance value is not greater than the value X, the system control unit 106 determines that the full-screen flash image causes discomfort, and the process proceeds to the step S705, in which the system control unit 106 in turn carries out the interpolation process for the frame boundary row, and when the average luminance value is greater than the value X, the system control unit 106 ends the process without carrying out the interpolation process. It should be noted that although in the present embodiment, the average luminance value of the entire corrected image or the frame boundary row is taken as an example, an average luminance value of an arbitrary region may be used. Also, the value X above is a value determined in advance as a value at which it is possible to output an image with no discomfort irrespective of whether the electronic shutter is on or off.

Thus, in the present embodiment, when an average luminance value of a corrected image or the like is greater than the predetermined value X, it is possible to output an image with no discomfort without carrying out the interpolation process. The other constructions and operational advantages are the same as those in the first and second embodiments described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-118924, filed Jun. 15, 2016 which is hereby incorporated by reference herein in its entirety.

What is claimed is:

1. An image pickup apparatus comprising:
an image pickup device configured to sequentially start exposure and sequentially read out signals for each row of pixels; and
at least one processor or circuit configured to function as the following units:
a detection unit configured to, based on an image signal output from the image pickup device, detect a flash band that appears in a plurality of frames consecutive in terms of time due to an external flash;
a correction unit configured to correct an image in at least one of the plurality of frames in which the flash band was detected by the detection unit to a full-screen flash image; and
a determination unit configured to determine whether a width of the flash band detected by the detection unit is equal to or greater than the number of rows in one frame,
wherein when the determination unit determines that the width of the flash band is not equal to or greater than the number of rows in one frame, the correction unit interpolates a row in which the flash band does not appear using a row in which the flash band appears and which immediately precedes or immediately succeeds the row in which the flash band does not appear.

2. The image pickup apparatus according to claim 1, wherein according to whether the external flash is fired within a time period over which an electronic shutter of the image pickup device is on, the determination unit determines whether the width of the flash band is equal to or greater than the number of rows in one frame.

3. The image pickup apparatus according to claim 1, wherein when a position at which an electronic shutter of the image pickup device was turned on is such a position that an exposure time period of the image pickup device is shorter than a value determined in advance, the correction unit does not interpolate the row in which the flash band does not appear.

4. The image pickup apparatus according to claim 1, wherein when an average luminance value of the corrected image is greater than a value determined in advance, the correction unit does not interpolate the row in which the flash band does not appear.

5. The image pickup apparatus according to claim 4, wherein the average luminance value of the corrected image is an average luminance value of the corrected image as a whole or an average luminance value in a row at a boundary between the row in which the flash band appears and the row in which the flash band does not appear.

6. The image pickup apparatus according to claim 1, wherein the correction unit interpolates the row in which the flash band does not appear by copying a row in which the flash band appears and which immediately precedes or immediately succeeds the row in which the flash band does not appear.

7. The image pickup apparatus according to claim 1, wherein the correction unit interpolates the row in which the flash band does not appear by averaging rows in which the flash band appears and which immediately precede and immediately succeed the row in which the flash band does not appear.

8. A video processing apparatus that corrects a video comprising a plurality of frames, comprising:
at least one processor or circuit configured to function as the following units:
a detection unit configured to detect a flash band that appears in a plurality of frames consecutive in terms of time among the plurality of frames;
a correction unit configured to correct an image in at least one of the plurality of frames in which the flash band was detected to a flash image by combining regions where the flash band appears in respective ones of the plurality of frames in which the flash band was detected; and
an output unit configured to output a video corrected by the correction unit,
wherein when a total number of rows in a region where the flash band appears in the plurality of frames in which the flash band was detected is smaller than the number of frames in one frame, the correction unit interpolates an image in a row at a boundary of the flash band using image data in the region where the flash band appears.

9. The video processing apparatus according to claim 8, wherein the correction unit interpolates the row at the boundary of the flash band by copying a row in which the flash band appears and which immediately precedes or immediately succeeds the row at the boundary of the flash band.

10. The video processing apparatus according to claim 8, wherein the correction unit interpolates the row at the boundary of the flash band by averaging rows in which the flash band appears and which immediately precede and immediately succeed the row at the boundary of the flash band.

11. A control method for an image pickup apparatus with an image pickup device that sequentially starts exposure and sequentially reads out signals for each row of pixels, comprising:

a detection step of, based on an image signal output from the image pickup device, detecting a flash band that appears in a plurality of frames consecutive in terms of time due to an external flash;

a correction step of correcting an image in at least one of the plurality of frames in which the flash band was detected in the detection step to a full-screen flash image; and a determination step of determining whether a width of the flash band detected in the detection step is equal to or greater than the number of rows in one frame, wherein when it is determined that the width of the flash band is not equal to or greater than the number of rows in one frame, a row in which the flash band does not appear is corrected using a row in which the flash band appears and which immediately precedes or immediately succeeds the row in which the flash band does not appear.

12. A non-transitory computer-readable storage medium storing a program for causing a computer to execute a control method for an image pickup apparatus with an image pickup device that sequentially starts exposure and sequentially reads out signals for each row of pixels, the control method comprising:

a detection step of, based on an image signal output from the image pickup device, detecting a flash band that appears in a plurality of frames consecutive in terms of time due to an external flash;

a correction step of correcting an image in at least one of the plurality of frames in which the flash band was detected in the detection step to a full-screen flash image; and a determination step of determining whether a width of the flash band detected in the detection step is equal to or greater than the number of rows in one frame, wherein when it is determined that the width of the flash band is not equal to or greater than the number of rows in one frame, a row in which the flash band does not appear is corrected using a row in which the flash band appears and which immediately precedes or immediately succeeds the row in which the flash band does not appear.

* * * * *